Aug. 12, 1969     H. K. JENSEN     3,460,426

MUSIC TEACHING APPARATUS

Filed May 19, 1967     4 Sheets-Sheet 1

INVENTOR
HARALD K. JENSEN

BY *Shanley & O'Neil*

ATTORNEY

Aug. 12, 1969  H. K. JENSEN  3,460,426
MUSIC TEACHING APPARATUS
Filed May 19, 1967  4 Sheets-Sheet 2

INVENTOR
HARALD K. JENSEN
BY Shanley & O'Neil
ATTORNEY

Aug. 12, 1969  H. K. JENSEN  3,460,426
MUSIC TEACHING APPARATUS
Filed May 19, 1967  4 Sheets-Sheet 3
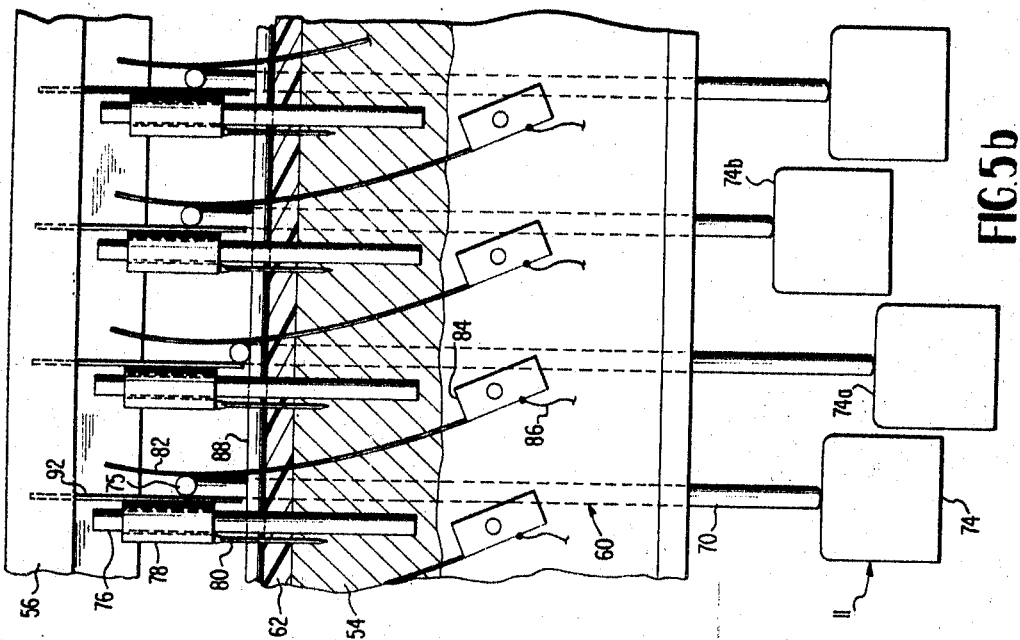
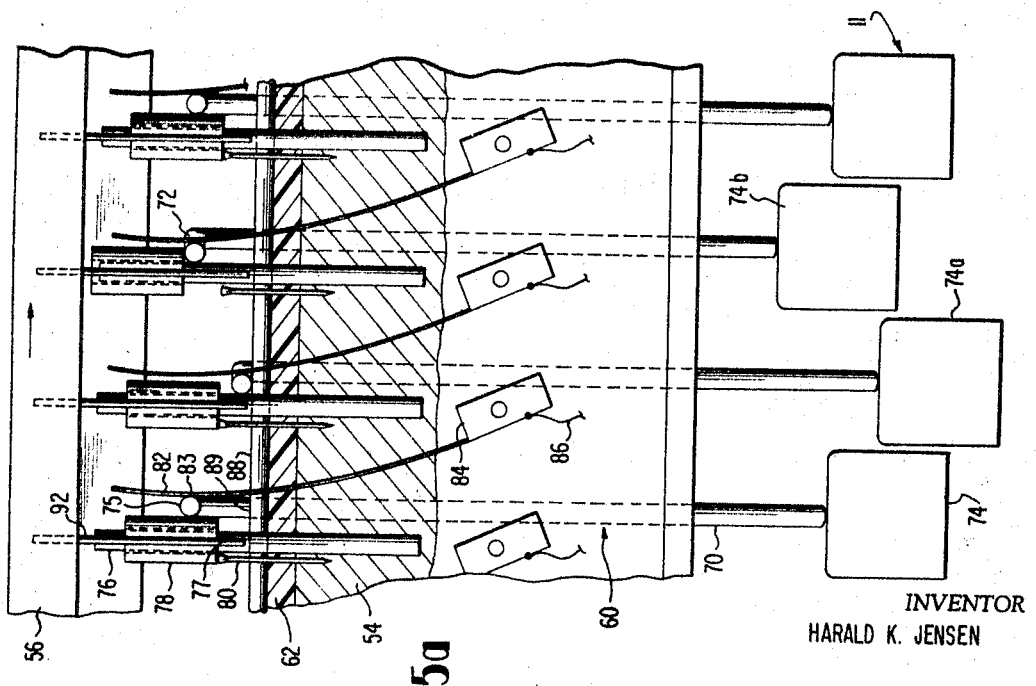
INVENTOR
HARALD K. JENSEN
BY Shanley & O'Neil
, ATTORNEY

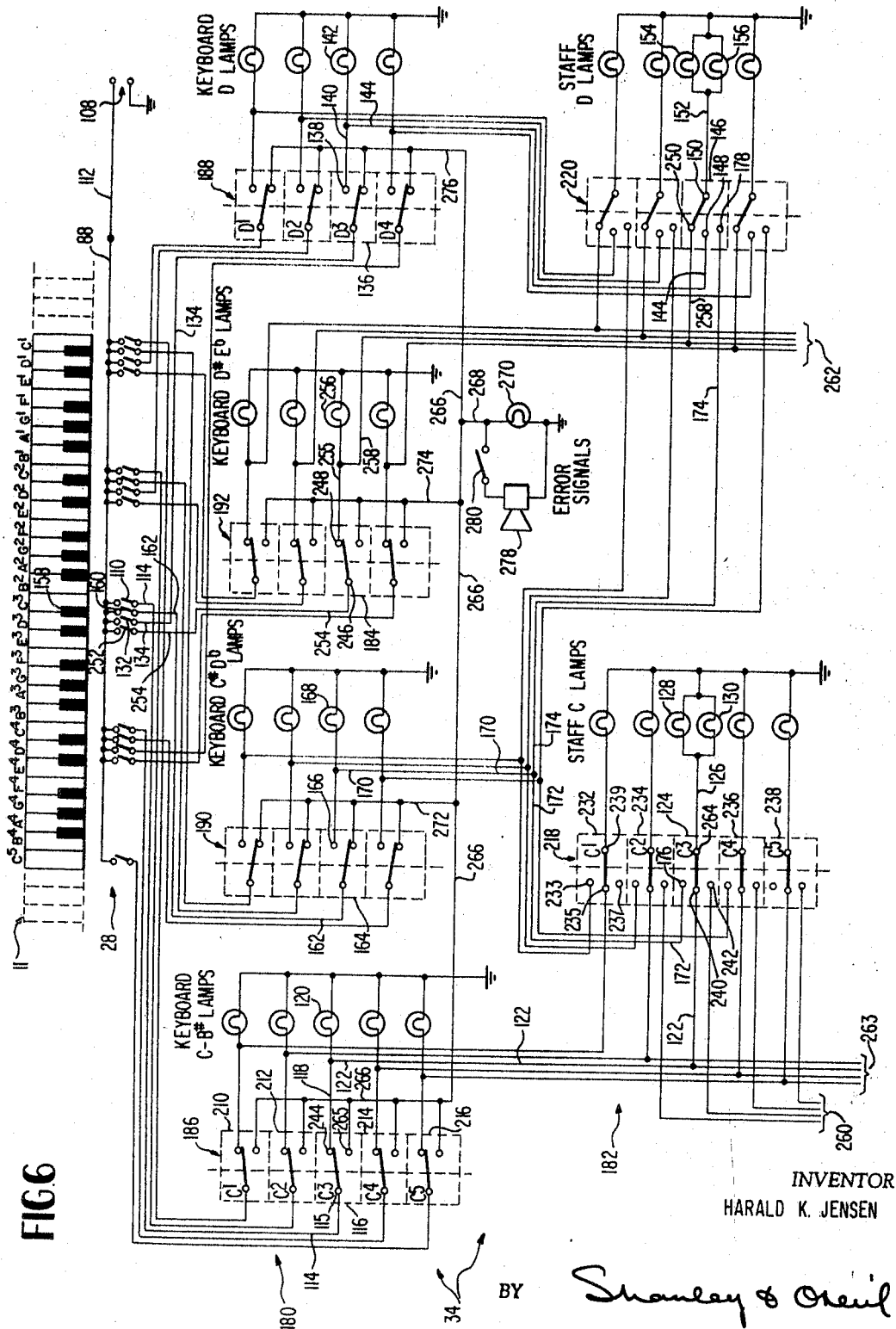

United States Patent Office 3,460,426
Patented Aug. 12, 1969

3,460,426
MUSIC TEACHING APPARATUS
Harald K. Jensen, Rowan, Iowa (348th Comb., Sup. Gp., Box 136, APO San Francisco, Calif. 96529)
Filed May 19, 1967, Ser. No. 643,796
Int. Cl. G09b 15/08
U.S. Cl. 84—478     17 Claims

ABSTRACT OF THE DISCLOSURE

Apparatus for teaching music includes an improved control switch arrangement adapted to be operatively associated with the keyboard of a musical instrument, a display panel depicting a series of distinctive musical tone positions, electric lamps for illuminating the tone positions, and circuitry electrically connecting the control switch and the lamps. By manipulating the keys on the keyboard of the musical instrument, the lamps corresponding to the individual keys are energized to illustrate various musical concepts. The control switch arrangement can be selectively operated to maintain the corresponding lamps in the energized condition upon release of the depressed key, or to deenergize the corresponding lamps upon release of the key. Selector switch means and circuitry are disclosed whereby, in any musical key signature, the corresponding lamps can be energized upon depression of a given key. A plurality of triangular boxes may be provided on the display panel for illustrating changes in musical key signature.

---

This invention relates to music, and more particularly to apparatus for teaching music.

The use of visual aids to education has become widespread because their value has been proved in assisting students to learn and instructors to teach.

Many of such devices are appropriate for education in a variety of fields, being independent of the subject matter to be projected. The instructor in the field of music, however, faces certain problems which are unique to his field and need not be faced by teachers in other areas of learning. The music teacher must work with different sounds, many of which differ only in nuance, and convey an understanding to his students of the various sounds which make up music, their differences, their mutual relationship, and the relationship of these sounds to the instruments which produce them. This situation is further complicated by the fact that these relationships change in accordance with the principles of musical composition. Various musical concepts, such as that of key signature, alter these relationships.

A still further problem which must be faced by an instructor who teaches the use of musical instruments is created by the fact that only a very limited number of students can closely observe a demonstration of the instrument, because the relatively small size of the instrument prescribes a confined area from which its manipulation can be properly observed.

A main object of the invention is the provision of improved music teaching apparatus which is simplified and compact, and yet permits visual illustration of the nature and use of a wide variety of musical concepts, to include the symbols used in musical notation, their meaning, sequence, and relationship to each other and to the sounds constituting music.

A further object of the invention is the provision of an improved music teaching device which facilitates the students' understanding of the correlation between the sounds constituting music, the musical note symbols which represent those sounds, and the keys on the keyboard of a musical instrument which produces such sounds.

Another object of the invention is the provision of an improved music teaching device which promotes an understanding of the changing key signatures used in musical notation.

Still a further object of the invention is the provision of an improved music teaching device which facilitates instruction of a large audience in the concepts of musical notation, and in the application of these concepts in relation to a keyboard type musical instrument.

Other objects of the present invention, its features and advantages will appear from the following detailed description which, when considered in connection with the accompanying drawings, discloses a preferred embodiment of the invention for purposes of illustration only and not for determination of the limits of the invention.

In the drawings, wherein similar reference characters denote similar elements throughout the several views.

Figure 1:
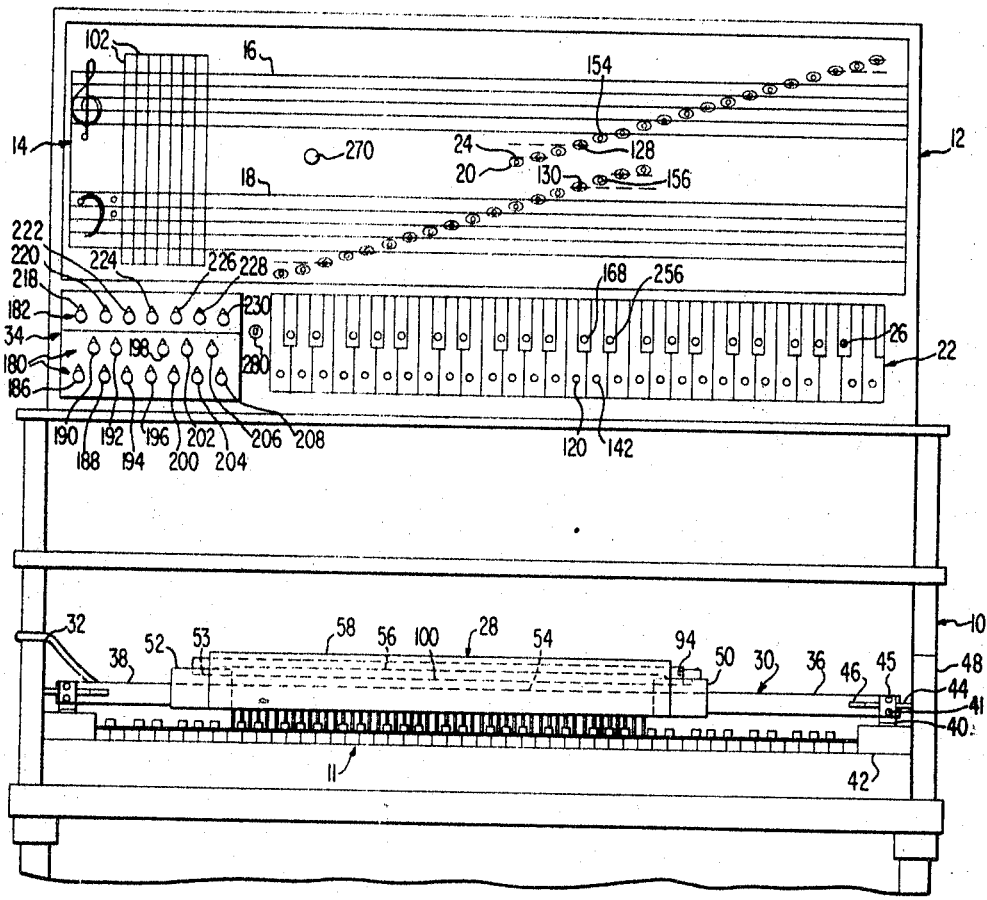
FIGURE 1 is a front elevational view showing the general arrangement of a music teaching device according to the invention mounted in operative position on a keyboard-type musical instrument.
Figure 3:
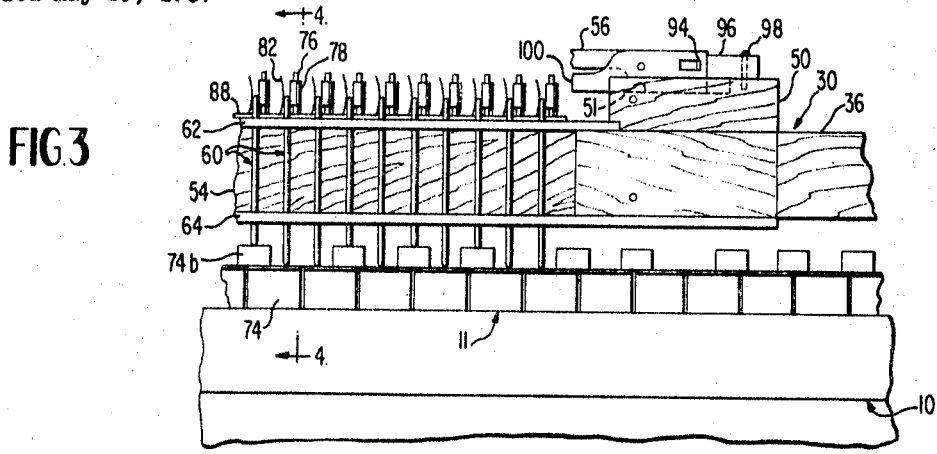
FIGURE 3 is a detail view in front elevation of a part of the control bar member and control switch means which are features of apparatus of FIGURE 1.

FIGURE 5, which is constituted by FIGURES 5a and 5b, depicts the control switch means of FIGURE 3 in rear elevation, FIGURE 5a showing the arrangement of the parts when the control switch means is in a first position, and FIGURE 5b showing the arrangement of the parts when the control switch means is in a second position; and FIGURE 6 is a wiring diagram schematically showing the circuitry of the music teaching apparatus of FIGURE 1.

Referring to drawings in greater detail, and with particular reference to FIGURE 1, music teaching apparatus that forms a preferred embodiment of the invention is shown in operative position mounted on an upright piano 10. Display panel means 12 are mounted so as to be visible to a large audience such as students in a classroom or lecture hall. According to the invention, means depicting a series of distinctive musical tone position are provided on the display panel. In the embodiment illustrated, such means include a musical staff arrangement 14 which comprises an upper staff 16 assigned the G or treble clef, and a lower staff 18 assigned the F or bass clef. Appropriate ledger lines are provided for each staff, as are music note symbols such as 20 which indicate the various lines and spaces on the staff arrangement which represent the pitch positions of various musical tones. In the preferred embodiment of the invention, the means depicting a series of distinctive musical tone positions also include a depicted simulation 22 of a segment of the keyboard 11 of the piano 10.

According to the invention, means are provided for illuminating each tone position. In the embodiment illustrated, the illuminating means take the form of an electric lamp, such as 24, positioned within the note symbol representing every tone position on the staff arrangement, and also an electric lamp, such as 26, identifying every key on the simulated keyboard.

According to the invention, control switch means generally indicated at 28 and adapted to be operatively associated with keys on the keyboard of a musical instrument, are provided for selectively energizing the illuminating means in response to depression of the keys. Control switch means 28 are shown carried by a control bar member 30 which supports the control switch means in operative position on the keys of the keyboard 11 of piano 10. A multi-conductor control cable 32 operatively connects the control switch means 28 with the display panel 12. Electrical circuit means, to be described in detail, are provided for electrically connecting in circuit relationship the illuminating means, the control switch means, and a source of electrical energy.

Selector switch means, generally indicated at 34 are provided in circuit relationship with the control switch means and the illuminating means for selecting the illuminating means to be energized upon depression of a key which is the illuminating means which corresponds to the musical tone position of that key in a desired musical key signature. The details of the selector switch means 34 are described hereinafter.

Control bar member 30 includes end members 36, 38 which extend laterally to the ends of the keyboard of piano 10. The outer end of member 36 carries a leg 40 which is supported on member 42, which is located at the end of the keyboard. Leg 40 is vertically adjustable by virtue of being mounted for vertical sliding movement in a vertical slot (not shown) in member 36, so that the control switch means can be properly positioned vertically with respect to the keyboard of the piano. Leg 40 may be secured in a desired position by setscrew 41.

Also provided at the outer end of member 36 is a rod 44 slidably arranged in a horizontal slot 46 in member 36. Rod 44 is adjustable to properly align control switch means 28 horizontally on the keyboard of a piano 10. Rod 44 bears against cheek plate 48 of the piano 10, and is secured in desired position by setscrew 45.

The outer end of end member 38 is provided with a vertically adjustable leg and horizontally slidable rod arrangement similar to that just described in connection with end member 36, to permit accurate vertical and horizontal alignment of the control switch means 28.

Control bar member 30 also carries support members 50 and 52 which are spaced apart from one another in the central portion of the control bar member 30. An elongated base member 54 extends between the support members 50 and 52. The upper surfaces of support members 50 and 52 are slotted at 51, 53 (see also FIGURES 3, 4) to guide an elongated guide member 100. Guide member 100 is secured to a cancelling strip member 56, which is slidable longitudinally relative to the base member 54, for purposes to be described hereinbelow. The central portion of the control bar member 30 is provided with a cover 58 to provide an attractive appearance by concealing the working parts of the control switch means 28.

In FIGURE 3, the arrangement of support member 50, end member 36, and cancelling member 56 is illustrated in detail, as is the relationship of these members to base member 54 and to the moving parts of the control switch means. A plurality of pushrod members 60 are provided, carried by elongated base member 54 and spaced longitudinally along the base member. Each pushrod member is mounted for vertical movement, and is adapted to be operatively associated with a selected key on the keyboard of the piano to move vertically in response to depression and release of the key. In the illustrated embodiment, guide means 62 and 64, which are associated with the base member, mount each pushrod member for vertical movement. As is best understood from FIGURES 3 and 4, guide means 62 take the form of an elongated strip of an insulating material such as plastic, which is secured to the upper surface of elongated base member 54 by threaded fastener 63. Guide means 64 take the form of a similar strip of material, secured to the lower surface of elongated base member 54. Guide means 62 and guide means 64 each project laterally of the base member, the respective projecting portions having aligned apertures 66 and 68 which receive arm 70 of pushrod member 60. The arm 70 is loosely received in the apertures so that the pushrod member 60 is mounted for pivotal movement about the longitudinal axis of the arm 70.

Each pushrod member 60 also has a second arm 72 which is horizontally swingable upon pivotal movement of the pushrod member about the first arm 70. Second arm 72 includes a contact 75 constituting a movable contact by virtue of the swingable arrangement of the second arm 72. In the illustrated embodiment, each pushrod member 60 is in the form of a solid rod of electrically conductive material such as copper or brass, whereby a portion of the second arm itself constitutes the movable contact 75. As will become apparent later, the movable contact in the embodiment illustrated is a bridging contact.

Figure 4:
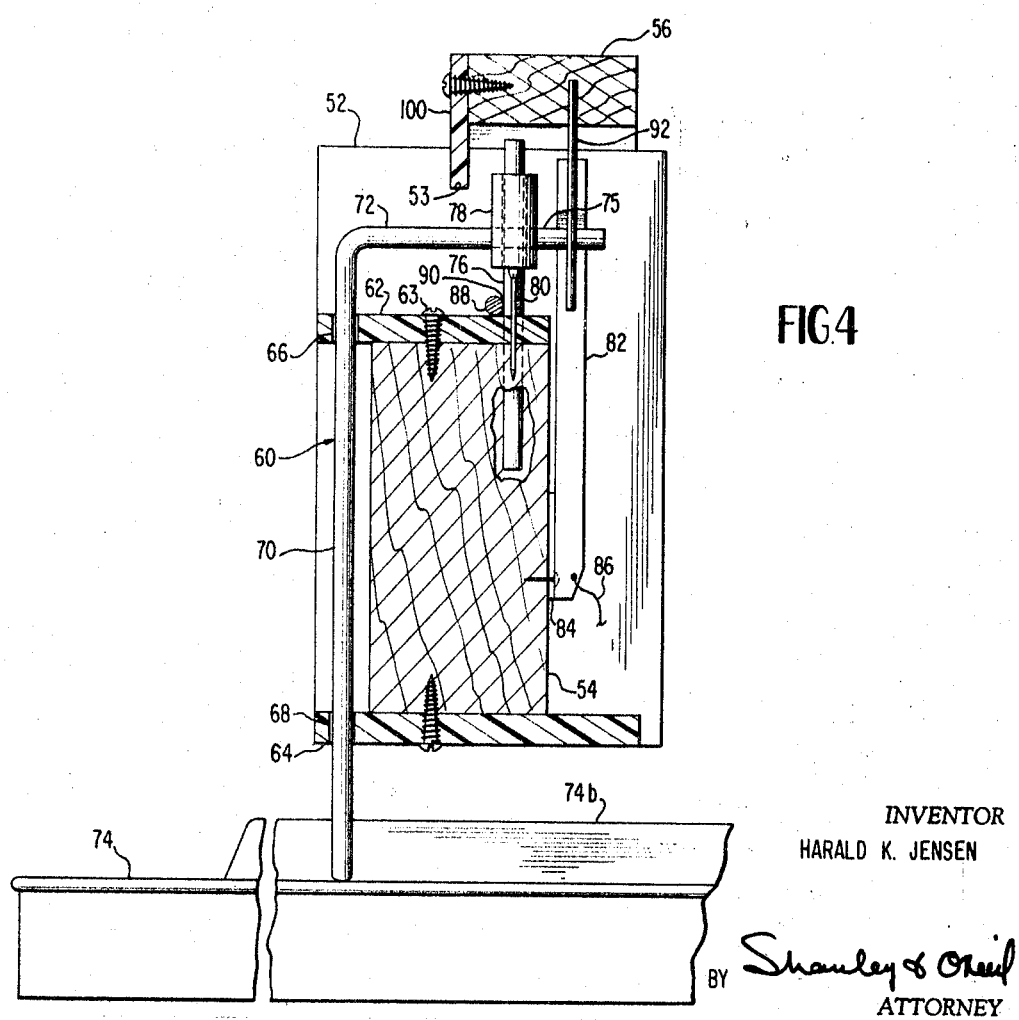
FIGURE 4 is a side view in vertical cross section illustrating details of the control bar member and control switch means of FIGURE 3.

As can be seen in FIGURE 4, the second arm 72 extends transversely relative to the base member and to the first arm 70 and in spaced relationship above the base member toward the rear of the apparatus. The first arm 70 of the pushrod member extends vertically and projects above the base member to a location at which it is joined by the second arm 72. The first arm has a lower portion which extends below the base member 54 and guide means 64 and engages key 74 on the keyboard of the piano 10. As is illustrated, in the preferred embodiment, the pushrod member 60 rests upon the upper surface of key 74, whereby the pushrod member moves vertically downwardly in response to a depression of the key performed in the course of sounding the instrument. The pushrod member moves vertically upwardly in response to release of the key, being carried by the key in the return of the key to its normal, undepressed position.

The second arm 72 of each pushrod member, in extending to the rear of the apparatus, passes to the left, as viewed in FIGURE 3, of a vertically projecting contact member 76. A vertical contact member 76, associated with the base member 54, is located adjacent each pushrod member 60. In the embodiment illustrated, the vertical contact member 76 is fixedly mounted in the base member 54, projects above the base member, and is positioned to engage the movable contact 75 upon horizontally swinging movement of the arm 72. As will be seen, this action of this control switch means closes a circuit energizing illuminating means on the display panel which are the illuminating means corresponding to key 74.

A protective member 78 in the form of a sleeve, of an insulating material such as plastic, is located adjacent each pushrod member and has a portion disposed laterally between vertical contact member 76 and movable contact 75.

As will be seen, protective or insulating sleeve member 78 is mounted for movement by the pushrod member. Each insulating sleeve member 78 is mounted for vertical sliding movement axially on the associated vertical contact member between a lower position in which it has a portion disposed laterally between the vertical contact member 76 and the movable contact 75, and an upper position in which it is above the movable contact 75. In the position of the parts illustrated in FIGURES 3 and 4, one side wall of the insulating sleeve member 78 is disposed laterally between movable contact 75 and vertical contact member 76. Since the sleeve member 78 is gravity-actuated to drop to this position, means are provided for maintaining a minimum length of each vertical contact member exposed in a direction towards the movable contact 75, past the lower end of the sleeve member 78. In the illustrated embodiment, such means take the form of a depth stop 80 associated with the base member adjacent each vertical contact member 76. As is best seen in FIGURES 4 and 5a, depth stop 80 is an elongated member which projects above the base member to maintain the lower end of sleeve member 78 a sufficient distance above the base member 54 and guide means 62 that the movable contact 75 can move past the lower end of the sleeve member 78 to engage the exposed portion of the vertical contact member 76 upon vertically downward movement of pushrod member 60 and horizontally swinging movement of arm 72.

In the illustrated embodiment, means located adjacent each pushrod member are provided for biasing arm 72 of each pushrod member 60 for horizontally swinging movement. Such means include spring means located adjacent one side of each pushrod member 60, associated with the base member 54, and including a contact member 83 (see FIGURE 5a) engaging the movable contact 75. Thus, a leaf spring 82, as illustrated in FIGURES 4 and 5, is secured to base member 54 through tab 84, and biases the associated pushrod member for pivotal movement about the longitudinal axis of the first arm 70. Since, in the illustrated embodiment, the leaf spring 82 is fabricated from an electrically conductive material such as brass, that portion of the spring engaging movable contact 75 constitutes contact 83. It can now be seen that movable contact 75 constitutes a bridging contact in the illustrated embodiment because, among other reasons to become apparent, contact 75 provides a conductive path bridging the gap between the contact members 83 and 76.

Each leaf spring 82 is electrically connected to a conductor 86, which is operatively connected to one side of a circuit energizing the illuminating means. The vertical contact member 76 is electrically connected to the other side of the circuit energizing the illuminating means through elongated common contact bar 88. Common contact bar 88 is associated with base member 54, disposed above base member 54 and extends longitudinally thereof and along guide means 62 as shown, and is electrically connected as at 90 to each vertical contact member 76 along the length of the control switch means. Thus it can be seen that the engagement of movable contact 75 with vertical contact member 76 by conductive spring means 82 will close a circuit energizing the illuminating means. When the apparatus is initially placed in operation, the insulating sleeve member 78 is interposed between movable contact 75 and vertical contact member 76 so that spring 82 cannot press the movable contact 75 into engagement with the vertical contact member to close the circuit. This is best illustrated in FIGURE 5a in relation to key 74. However, when a key is depressed, as is key 74a in FIGURE 5a, and when the cancelling means, about which more will be discussed, is in the inoperative position as is the case in FIGURE 5a, the associated pushrod member will move vertically downwardly in response to depression of the key, and the arm 72 will move downwardly past the lower end of insulating sleeve 78 and swing horizontally against the exposed portion of vertical contact member 76 by virtue of the force exerted by spring 82 on arm 72. In this fashion, a circuit to the corresponding illuminating means is closed, and the illuminating means are energized.

Upon release of the key, as is the case with key 74b in FIGURE 5a, the pushrod member is moved vertically upwardly by the return of the key to its normal position. Since key 74b is a black piano key the normal position of its upper surface is above that of adjacent white keys. In moving upwardly, the second arm 72 of the pushrod member engages the lower end of sleeve member 78 and slides the sleeve member vertically upwardly above the pushrod member so that the movable contact 75 is maintained in engagement with the vertical contact member 76, so that the respective illuminating means is maintained in energized condition notwithstanding the release of the key. It will thus be seen that the control switch means 28 includes means for maintaining the respective illuminating means in energized condition upon release of a depressed key when the control switch is in a first position.

According to the invention, means are provided for selecting the position of the control switch means. Cancelling strip member 56, to which reference was made hereinabove, is included in such means. Cancelling strip 56 extends generally parallel to and in spaced relationship above the base member 54. The strip 56 is mounted by members 50 and 52 for sliding movement longitudinally relative to the base member. The cancelling means includes a finger 92 located adjacent each pushrod member 60. In the embodiment illustrated, the fingers 92 are mounted in cancelling strip member 56 and each finger depends to a location on the side of a movable contact 75 which is opposite from the side on which the spring means 82 is located. This is best seen in FIGURE 5a, wherein the spring means 82 is located on the right side of movable contact 75 as viewed from the rear of the device, and finger 92 depends to a location on the left side of movable contact 75. In this position, which is the inoperative position for the cancelling means, the cancelling finger 92 in no way interferes with the action of spring means 82 in pressing movable contact 75 laterally into engagement with vertical contact member 76 upon vertically downward movement of the pushrod member 60 in response to depression of a key. The spring simply presses the movable contact sideways past the lower end of insulating sleeve member 78. In the inoperative position, the cancelling finger 92 is thus located out of the path of travel of swingable arm 72.

Many times it is desirable in the use of music teaching apparatus according to the invention to deenergize the illuminating means upon release of the depressed key. Further it is necessary to return the sleeve members 78 to their original position on the depth stops after use of the control switch means in its first position. Accordingly, a forwardly projecting tab member 94, best seen in FIGURE 3, is provided by which the operator can move the cancelling means longitudinally relative to the base member to an operative position. In the course of such movement, each finger 92 engages a pushrod member 60 and moves the movable contact 75 to a location spaced away from the vertical contact member 76 against the biasing force of the spring means 82 a distance sufficient to permit the sleeve member to drop to its original position. FIGURE 5b illustrates the position of the parts when the cancelling means are in the operative position. And as can be seen in FIGURE 5b, each finger 92 engages the swingable arm 72 of the associated pushrod member 60 and maintains the movable contact 75 a distance spaced away from the associated vertical contact member 76. Thus, in the operative position of the cancelling means, the finger 92 is disposed in the path of travel of the swingable arm 72 so that the movable contact 75 cannot engage the vertical contact member 76. The cancelling finger 92 thus acts against the force of the spring means 82. When a key such as 74a is depressed in the position of the parts illustrated in FIGURE 5b, the pushrod member 60 moves vertically downwardly in response to depression of the key, but the movable contact 75 is not flipped sidewise into engagement with the vertical contact member 76. Rather, movable contact 75 engages common contact bar 88 and in so doing closes a circuit energizing the corresponding illuminating means. When the key 74a is released, the pushrod member 60 moves vertically upwardly in response to release of the key between finger 92 and spring 82, and in so doing moves the movable contact 75 upwardly out of engagement with the horizontal contact bar 88, to open the circuit energizing the illuminating means. It will thus be seen that the control switch means 28 according to the invention includes means for deenergizing the illuminating means upon release of the depressed key, when the control switch means is in operative position. Common contact bar 88 thus constitutes a horizontal contact member located adjacent each pushrod member and disposed to engage and disengage movable contacts 75 upon vertical movement of the pushrod member in response to depression and release of the associated key. In the preferred embodiment of the invention illustrated, the common contact bar 88 acts as the horizontal contact member for each pushrod member, and as the conductive means which electrically connects the vertical contact members 76 to one side of the circuit energizing the illuminating means. Such an arrangement is advantageous because it contributes to the simplicity and compactness of the apparatus. One result of this arrangement is that, when the cancelling means is in the inoperative position, the movable contact 75 engages both the horizontal contact member 88 and a vertical contact member 76 upon the depression of the associated key, whereby the circuit energizing the illuminating means includes two closed paths. One closed path is opened upon release of the key and upward movement of the movable contact to disengage the horizontal contact member. But since the energizing circuit including the other closed path remains closed through the vertical contact member, the illuminating means remains energized. When the cancelling means is in the operative position, the circuit energizing the illuminating means is closed across only one path, by engagement of the movable contact with the horizontal contact member, and the closed circuit including this one closed path is opened by upward movement of the movable contact in response to release of the key.

In the illustrated embodiment, the vertical contact member 76 takes the form of a post of electrically conductive material such as brass. In such case, that portion 77 of the vertical member which is disposed to engage the movable contact 75 constitutes a first fixed contact which cooperates with the movable contact 75 to close a circuit energizing the illuminating means. Similarly, since common contact bar 88 is a continuous bar of copper or other electrically conductive material, that portion 89 of the bar which is disposed to engage and disengage the movable contact 75 constitutes a second fixed contact which coacts with the movable contact 75 to close the energizing circuit.

Returning now to FIGURE 5a, the discussion was left at a point in which the key 74b had been released but the circuit energizing the corresponding illuminating means remained closed by virtue of the movable contact 75 remaining in engagement with the vertical contact member 76 upon the movement of insulating sleeve member 78 upwardly by the pushrod member 60. The illuminating means will remain in energized condition until the cancelling means is moved to the operative position. Accordingly, the operator moves the cancelling strip 56 to the right, in the direction of the arrow in FIGURE 5a. The cancelling fingers 92 will engage the arms 72 of the pushrod members 60 to swing the arms 72 against the force of the spring means 82 and move the pushrod members pivotally about the longitudinal axes of arms 70 a distance sufficient for the insulating sleeve members to drop by gravity to their original disposition between the movable contact 75 and the vertical contact member 76. After such is done, the cancelling means can be left in its operative position, or returned to its inoperative position, depending upon the mode of operation in which it is desired next to be used. Means are provided for locking the cancelling means in the operative position. In the illustrated embodiment, such means include a knob 96 (FIGURE 3) which is mounted on the upper surface of supporting member 50 adjacent the end of cancelling strip member 56. The knob is mounted for eccentrically rotational movement about a pin 98 projecting upwardly from supporting member 50. By moving the knob 96 about the pin 98 into the position illustrated, wedged against the end of strip member 56, the cancelling means can be locked in the operative position.

In FIGURE 4, elongated guide member 100 extends downwardly a sufficient distance to prevent the pushrod member 60 from falling out of guide means 62 and 64 upon any accidental inversion of the control bar 30. Similarly, the lower surface of cancelling strip 56 is positioned sufficiently close to the top of vertical contact members 76 so that insulating sleeve members 78 will not slip off the vertical contact posts upon such accidental inversion.

Figure 2:
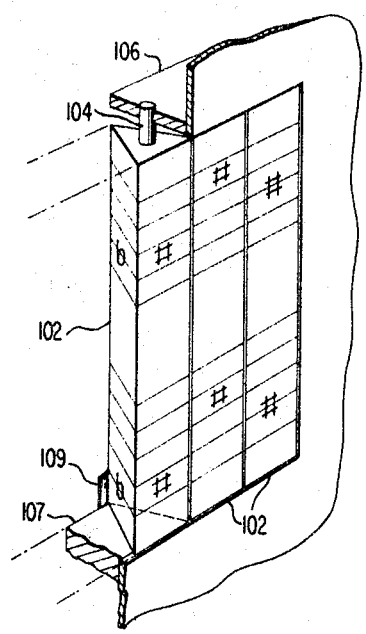
FIGURE 2 is a detail view, in perspective and partly in section, of a feature of the apparatus of FIGURE 1 which facilitates instruction in the concept of musical key signature.

Returning now to FIGURE 1, a feature of the invention is the provision of changeable means associated with the music staff arrangement 14, for depicting changes in musical key signature. Such means include a plurality of vertically extending members 102. The members 102 are arranged in relation to the musical staffs at locations where characters denoting key signature are customarily inserted. Seven members 102 are provided, each extending across both staffs. As is best understood from FIGURE 2, each of the members 102 is triangular in plan view, and has, at appropriate locations relative to the music staffs, musical sharp symbolism depicted on one face and musical flat symbolism depicted on another face. Blank staff symbolism (lines and spaces) is depicted on the third face, as shown in FIGURE 1. Means are provided for mounting each triangular member for independent rotatable movement on the display panel 12 to a position in which any selected face is in generally coplanar relationship with the musical staff arrangement. In the embodiment illustrated, the mounting means include vertically extending shaft means 104 which are journaled in suitable mountings 106, 107 which are secured to the face of the display panel 12. Springs 109, secured to member 107, are provided with vertically extending, shallow grooves which receive the rear edges of members 102 to hold the members in desired position, but readily release members 102 when manual pressure is applied to rotate the members about the axes of the shaft means to a new position. Thus, the instructor can quickly illustrate the arrangement of sharps or flats, and/or blank staff symbolism which is appropriate for the musical key signature under discussion. All 15 possible musical key signatures, from the key of C through keys of seven sharps and seven flats can be quickly illustrated.

The electric circuitry of the apparatus of FIGURE 1 will be discussed in connection with FIGURE 6, which schematically illustrates a portion of the control circuit sufficient to impart an understanding of the principles of the invention.

In FIGURE 6, control switch means 28 are illustrated in diagrammatic relation to the keys on the keyboard 11 of the piano. Control switch means 28 are illustrated as comprising a plurality of individual piano key switches, each switch associated with a particular key on the keyboard. From the foregoing discussion, it will be understood that the movable contact of each piano key switch is constituted by movable contact 75. The fixed contact on the piano key side of the circuit as viewed in FIGURE 6 represents fixed contacts 77 and 89 of FIGURES 5a, 5b. It will be recalled that the mode of operation selected for the control switch determines which of the fixed contacts is engaged by the movable contact. The fixed contact at the lamp side of the circuit as viewed in FIGURE 6 represents the contact portion 83 of each leaf spring 82 which is in engagement with movable contact 75.

In the preferred embodiment of the invention, control switch means 28 includes a piano key switch for every key, black and white, on the keyboard of the piano throughout four full octaves, from two octaves below middle C to two octaves above middle C. In FIGURE 6, middle C is designated as $C^3$, C below middle C is designated $C^2$, C above middle C is termed $C^4$, C two octaves below middle C is designated $C^1$, and C two octaves above middle C is termed $C^5$. Other notes are provided with numerical superscripts corresponding to their octave. For example, $D^3$ is used to designate D in the middle octave. Upon depression of the key on the piano which produces the sound known in music as middle C, the associated piano key switch 110 closes a circuit for electrical energy to flow from a source 108 through conductor 112, common contact bar 88, switch 110 and conductor 114 to a pole 115 of a switch 116. For the sake of clarity of illustration, pole 115 will be termed an entry pole and poles 244 and 265 will be termed exit poles. With the switch 116 in the position illustrated, current will flow across the switch and through conductor 118 to energize lamp 120, which is appropriately positioned to identify middle C in the depicted simulation 22 of the keyboard (see FIGURE 1). In FIGURE 6, current will also pass through conductor 122 to the entry pole 240 of switch 124. With switch 124 in the position illustrated, current will flow across the switch and through conductor 126 to energize lamps 128 and 130, which are mounted within the note symbols on the music staff arrangement which represent the musical sound corresponding to middle C. As is best understood from FIGURE 1, two lamps are provided to identify middle C because, through the use of ledger lines, middle C appears twice on the music staff arrangement, the sequence of symbols used on the bass and treble clefs being provided in overlapping relationship to facilitate an understanding of the relationship of these two clefs and to promote longitudinal compactness of the display panel. As will be apparent, for notes located at a position where the two scales do not overlap, only one lamp is provided on the music staff arrangement.

In another example, depression of the piano key identified as $D^3$ on FIGURE 6, which is D a full step above C in the middle octave, closes the associated piano key switch 132 to provide a circuit for current to flow from electrical energy source 108, through conductors 112 and 88, across switch 132 and by conductor 134 to the entry pole of switch 136. Although switch 136 is illustrated in another position for purposes of later illustration, when switch 136 is closed across the entry pole and exit pole 138, current will flow across the switch and through conductor 140 to energize lamp 142 in the keyboard replica (see also FIGURE 1). Current also flows through conductor 144 to the entry pole 148 of switch 146. For purposes to be described, pole 148 will be termed a natural entry pole. When switch 146 is closed across natural entry pole 148 and exit pole 150, current flows in conductor 152 to energize music staff arrangement lamps 154, 156 which identify the tone position of the D in the music staff arrangement 14 (see FIGURE 1). As was the case with middle C ($C^3$), since the note sequences illustrated on the two staffs in the music staff arrangement 14 overlap, two lamps are provided to depict $D^3$ because such tone position appears twice on the music staff arrangement.

In the illustrated embodiment, an arrangement similar to that described in connection with C and D in the middle octave is provided for every key, black and white, on the keyboard of the piano throughout four full chromatic octaves. Thus, it will be apparent that the musical staff arrangement and associated illuminating means on the display panel will also cover four octaves, and that the depicted keyboard and associated illuminating means also encompass four octaves.

In a typical black key wiring arrangement, depression of black key 158, which produces a tone a half step between $C^3$ and $D^3$ and is thus known both as C♯ and D♭, depending upon the note used as the base reference, closes piano key switch 160 to permit current to flow from source 108, through conductors 112 and 88, across switch 160 and through conductor 162 to the entry pole of switch 164. With switch 164 closed between the entry pole and exit pole 166, current will flow to energize lamp 168 in the keyboard replica (see also FIGURE 1). A path for current also exists through conductor 170 to branch conductors 172 and 174. Conductor 172 leads to the entry pole 176, termed a sharp entry pole for reasons to become clear, of switch 124. Branch conductor 174 leads to the flat entry pole 178 of switch 150. Depending upon the setting of switches 124 and 146, lamps 128 and 130, or lamps 154 and 156 may be energized on the music staff arrangement. As will be discussed, the setting of switches 124 and 146 is done in accordance with musical key signature.

As those skilled in the art are well aware, a note symbol on a music staff may represent any of three different but closely related sounds since the music staff depicts only the notes of a diatonic scale but musical instruments produce the full chromatic scale, which includes more sounds than the diatonic scale. For example, a note depicating a C on a music staff may, depending upon the key signature of the music or other requirement by the composer, may represent (1) the tone known as natural C, or (2) the tone a half step above natural C known as C♯, or (3) the tone a half step below natural C known as C♭. This is also true of note symbols representing D or any other pitch position on a music staff. This music concept means that each lamp on the music staff arrangement 14 must be capable of energization by depression of any of three keys on the piano: the sharp, the natural, and the flate for that particular note position. Music teaching devices according to the present invention incorporate an improved and simplified apparatus for achieving this result.

It will be recalled that the circuits between the respective piano key switches and the keyboard replica lamps included switches 116, 164 and 136. The circuits to the staff lamps also incuded switches 124 and 146. Such switches constitute part of the selector switch means 34, to which reference was previously made. In the preferred embodiment of the invention, selector switch means 34 are provided in circuit relationship with the control switch means and the illuminating means, for selecting the illuminating means to be energized upon depression of a selected key. The illuminating means to be energized are the illuminating means corresponding to the musical tone position of the selected key on the music staff arrangement in a desired key signature, and the illuminating means corresponding to the musical tone position of the selected key on the depicted keyboard. In the illustrative embodiment, selector switch means 34 includes first switchbank means 180 and second switchbank 182. The first switchbank means 180 has a first switch means corresponding to each key on the keyboard on the musical instrument throughout at least a chormatic octave. There are thirteen keys provided on a piano to encompass a full chromatic octave. However, twelve switch means are provided in the preferred embodiment, there being no necessity for a thirteenth switch means because the thirteenth key is assigned the same appellation in the scale as the first key but is one octave higher. Therefore, one switch means can be provided for both the first and the thirteenth key. For example, it will be recalled that each C octave begins and ends with a C. Hence, only one first switch means need be provided to correspond to both C notes. Accordingly, first switch means 186 corresponds to the C notes on both ends of each chromatic octave beginning with C. As for the other first switch means, first switch means 188 is provided to correspond to the D key in a chromatic octave on a piano, first switch means 190 corresponds to the C♯–D♭ key, and first switch means 192 corresponds to the D♯–E♭. The arrangement of these first switch means in first switchbank means 180 to facilitate manipulation by the operator, is best seen in FIGURE 1, which also illustrates the arrangement of the first switch means which correspond to the other piano keys in a chromatic octave. Thus, first switch means 194 corresponds to the E key in a chromatic octave on the piano keyboard, first switch means 196 corresponds to the F key, first switch means 198 corresponds to the F♯–G♭ key, first switch means 200 corresponds to the G key, first switch means 202 corresponds to the G♯–A♭ key, first switch means 204 corresponds to the A key, first switch means 206 corresponds to the A♯–B♭ key, and first switch means 208 corresponds to the B natural–C♭ key in the chromatic octave on the piano. It should be noted that first switch means 186, in addition to corresponding to the C natural key corresponds also to the B♯ key since the tones known as B♯ and C natural are identical for all practical purposes. Thus also, the tone known as F♭ is identical to E natural, and the tone known as E♯ is identical to F natural. This is a result of the arrangement of the whole and half steps of a diatonic octave within a chromatic octave, as is well known to those skilled in the art.

In the embodiment illustrated, each first switch mean has as separate entry pole and exit pole corresponding to every key on the keyboard of the musical instrument which is operatively associated with the control switch means 28, and which is assigned the same relative position in the chromatic scale. Thus, first switch means 186 is a five-pole, two-position switch which is depicted as five single-pole, two position switches connected for ganged operation, for clarity in illustration. Switch 116 in the middle C illuminating circuit is one switch included in switch means 186. Switch 210 is another switch included in switch means 186, and is operatively connected to energize corresponding illuminating means when the $C^1$ key (the C two octaves below middle C) is depressed. Switch 212 is similarly connected with respect to $C^2$. Switch 214 is similarly connected to $C^4$. Switch 216 is similarly connected to $C^5$. At this time it should be noted that as a result of spanning four full octaves, each of which begins and ends with a C, there are five C switches in first switch means 186. However, since all notes other than C occur only four times throughout the four octaves, the other first switch means (such as 188) need only be four-pole, two-position switches. A second switchbank means is provided having a second switch means corresponding to each music note position on a music staff throughout at least a diatonic octave. In the embodiment illustrated, second switchbank means 182 has a second switch means corresponding to each music note position on a music staff throughout one diatonic octave. There are eight note or pitch positions in a diatonic octave and accordingly, there are eight music note positions on a staff to span that octave, it being noted that diatonic, not chromatic, scales are depicted on a music staff. However, seven second switch means are provided in the preferred embodiment, there being no necessity for an eighth because the eighth pitch position in a diatonic octave is assigned the same appellation as the first position, but is one octave higher. Hence, one second switch means can be provided for both the first and the eighth pitch positions. For example, an octave with C in the first position has a C in the eighth position, and only one second switch means need be provided to correspond to both C pitch position, and accordingly, second switch means 218 corresponds to the notes at both ends of the diatonic series beginning with C. As for other second switch means in the illustrated embodiment, second switch means 220 corresponds to the D note position in a diatonic octave. As is best understood from FIGURE 1, second switch means 222 corresponds to E note position, switch means 224 corresponds to the F note position, second switch means 226 to the G position, second switch means 228 corresponds to the A position, and second switch means 230 corresponds to the B position.

In the illustrated embodiment, second switch means 218 is a five-pole three-position switch, depicted as five single-pole, three-position switches connected for ganged operation. As was the case with first switch means 186 in switchbank 180, all other second switch means need only be four-pole switches, since the notes to which they correspond recur only four times throughout the four octaves while the C note occurs five times. Switch 124, operatively connected in the middle C circuit, constitutes a part of second switch means 218. Switch 232 is a similar switch and is located in the circuit through which $C^1$ is operatively connected to corresponding illuminating means, and switch 234 is in the circuit energizing the illuminating means corresponding to $C^2$. Switch 236 is the circuit associated with $C^4$, and switch 238 is operatively connected to illustrate the note position of $C^5$.

Each second switch means has a sharp entry pole, a flat entry pole, a natural entry pole, and an exit pole corresponding to each music note position on the staff arrangement which is assigned the same relative position in a diatonic scale. Thus, switch 124 has a sharp entry pole 176, a natural entry pole 240, and a flat entry pole 242 and exit pole 264 for the music note position known as middle C ($C^3$). Switch 232 has a sharp entry pole 233, a natural entry pole 235, a flat entry pole 237, and an exit pole 239, all corresponding to $C^1$. As a further example, switch 146, which constitutes a part of second switch means 220, has a sharp entry pole 250, a natural entry pole 148, a flat entry pole 178, and an exit pole 150, corresponding to $D^3$.

Considering switch 124, it can be seen that depending upon the setting of second switch means 218, illuminating means 128 and 130 can be energized by a signal emanating from any of three entry poles, the sharp, the natural, or the flat.

As previously indicated, electrical circuitry is provided to operatively connect the control switch means, the first switchbank means, the second switchbank means, and the respective illuminating means. Such circuitry includes means electrically connecting each entry pole of each first switch means with the control switch means to complete a circuit to the first switch means which is closed upon depression of a corresponding key. As an example, it will be recalled that conductor 114 connected the entry pole of switch 116 to control switch means 28 and completed a circuit to switch 116 from the energy source, which circuit was closed upon depression of middle C.

Means are provided electrically connecting each exit pole of each first switch means with a corresponding depicted keyboard illuminating means to complete a circuit which is closed upon depression of a selected key to energize the corresponding depicted keyboard illuminating means. Thus, conductor 118 electrically connects exit pole 244 of switch 116 to complete a circuit to keyboard replica illuminating means 120. To accommodate changes in musical key signature, means are provided for selectively electrically connecting the exit poles of the first switch means to the sharp entry poles, the flat entry poles and the natural entry poles respectively of the corresponding second switch means which are the second switch means corresponding to the music staff note positions which are the music staff note positions of the keys on the keyboard which are the keys corresponding to the exit poles of the respective first switch means, in the various musical key signatures. Thus means are provided to define a plurality of separate selective circuits for electrically connecting each first switch means to every second switch means which is the second switch means corresponding to a music staff note position of the key on the keyboard which is the key corresponding to the first switch means, in all musical key signatures. To illustrate, it will be recalled that each black piano key known as C♯ (which is also known as D♭) can be used in musical composition as either a C or a D, depending upon the dictates of the composer. Thus, a musical work may be written in a key signature in which wherever a C appears on the music staff the tone known as C♯ is actually to be sounded in the course of performing the work. Similarly, a note appearing on the staff in the pitch position of D may actually be required to be sounded as a D♭. C♯ and D♭ are identically the same musical tone, so the key on the piano which produces that tone must be capable of illuminating both the C and D lamps. Thus, a signal energizing keyboard replica lamp 168 which corresponds to the C♯–D♭ key in the middle octave, also produces a signal for conductor 170. This signal passes by way of conductor 172 to the sharp entry pole 176 of switch 124. When the key signature requires that a C on a staff be played as a C♯, switch means 218 are set so that the signals to the exit pole of all switches included in second switch means 218, including switch 124, are connected to the sharp entry poles of the switches. Thus switch 124 would be set so that exit pole 264 receives the signal from entry pole 176, whereby the corresponding illuminating means 128 and 130 would be energized by depression of the C♯³ black key on the piano. However, if the musical key signature was a D♭, switch means 220 is set so that a signal from conductor 170 would pass through conductor 174 to flat entry pole 178 of switch 146 and would bridge to exit pole 150 of switch 146, whereby staff D³ lamps 154 and 156 would be energized. While the foregoing discussion has been made with reference to the wiring of the middle octave, it will be understood that every other black key on the piano representing C♯–D♭ in other octaves is wired to be in operative association with the music staff arrangement illuminating means in the corresponding octave in the manner just described for the wiring of the middle octave. By virtue of the second switch means being three-position switches, means are provided for selecting the circuit electrically connecting each first switch means through the corresponding switch means in accordance with desired musical key signature. By selecting the position of each second switch means to selectively electrically connect the appropriate first switch means to the corresponding second switch means, each key on the piano keyboard can be made to energize the music staff arrangement illuminating means to which it corresponds in any desired musical key signature.

As a further illustration of this feature, first switch means 192 and 220 are set in accordance with a musical key signature which dictates that a note symbol in the D position on a staff shall be sounded as a D♯. Thus, first switch means 192 is positioned as illustrated, in which the entry pole 246 and exit pole 248 of switch 184 are bridged, as are corresponding contacts in every other switch that forms a part of first switch means 192. Second switch means 220 is set as illustrated, so that sharp entry pole 250 and exit pole 150 are bridged in the switch 146, as are corresponding poles in every other switch that constitutes a part of second switch means 220. Whenever the D♯³ key is depressed to perform a D³ appearing on a music staff, in accordance with the dictates of musical composition, a signal will energize the corresponding lamps 154, 156 on the staff arrangement, because the depression of the D♯³ key closes switch 252 to close a circuit from energy source 108 through conductors 112 and 88, across switch 252 and through conductor 254 to entry pole 246 of switch 184. The signal passes through conductor 255 and energizes lamp 256 in the keyboard replica (see also FIGURE 1), and current also passes in conductor 258 to sharp entry pole 250 in switch 146, and across the bridging contact to exit pole 150 to energize lamps 154 and 156 on the music staff arrangement. It will be recalled that, when switch means 220 was set to bridge between contacts 148 and 150, depression of the D³ natural key energized lamps 154 and 156. With the switch means 220 in the position illustrated, depression of the D³ natural key does not energize the lamps 154 and 156 since such is done by the D♯³ key. And, in the same fashion, depression of the D natural key in any other octave will not operate to energize the corresponding staff arrangement illuminating means because such is done by the D♯ key in that octave.

It will thus be apparent that by the proper manipulation of the lower and upper switchbank means, any key on the keyboard of the piano can be made to illuminate the proper staff arrangement illuminating means when the key signature or other dictates of musical composition so require. Thus, as another example, the staff C lamps can be energized by depression of the C natural keys, the C♯ keys, or the C♭ keys. When second switch means 218 is connected so that all internal switches are closed across the sharp entry poles and the exit poles, depression of the C♯ keys will operate to energize the staff C lamps. When the second switch means 218 is set to bridge each natural entry pole and exit pole, depression of the natural C keys energizes the lamps. When second switch means 218 is closed to bridge the flat entry poles and the exit poles, depression of the C♭ keys is operative to energize the staff C lamps. It should be noted, however, that whether the staff C lamps are being energized by the C♯, C♭ of C natural keys, the depicted keyboard lamps are illuminated only by the single key to which a respective keyboard lamp corresponds, unless that key is switched off into the error circuit described hereinbelow. For example, since second switch means 220 is illustrated in position to energize staff D lamps 154, 156 upon depression of the D♯³ keys, and thus would not energize the staff D³ lamps upon depression of the D³ natural key, the depicted keyboard lamp 142 corresponding to the D³ natural key would still be illuminated by depression of D³ natural if switch 136 were closed across the entry pole and exit pole 138.

Since the tone known as C♭ is identical to B natural, note that, at 260, leads to the flat entry poles of second switch means 218, emanate from the exit poles of the B natural (C♭) first switch means 208, so that when C♭ is required by the musical work, the C lamps on the staff can be energized by depression of the B natural key. Similarly, since the tone known as D♯ is identical to that known as E♭, leads at 262 pass to the flat entry poles of the second switch means 222 corresponding to the E note position in the diatonic octave. And, since the tone known as C natural is identical to that known as B♯, leads at 263 pass to the sharp entry poles of the second switch means 230 which corresponds to the B note position in the diatonic octave.

When switch means 220 is closed so that each switch such as 146 is bridged between the sharp entry pole and the exit pole, depression of the D♯ keys on the keyboard is operative to energize the staff D lamps. When second switch means 220 is closed to bridge between the natural entry poles and the exit poles, depression of D natural keys is operative to energize the staff D lamps. When the switch means 220 is positioned to bridge between the flat entry poles and the exit poles, depression of the D♭ keys is operative to energize the staff D lamps. This arrangement is similar to that of all second switch means.

It will have been observed that means are provided electrically connecting each exit pole of each second switch means with corresponding music staff arrangement illuminating means to complete a circuit which is closed upon depression of a selected key to energize the corresponding music staff illuminating means. For example, conductor 126 is provided between exit pole 264 of switch 124 and staff lamps 128 and 130.

Thus far, discussion has been confined to the various manipulations which are made in the circuit according to the invention to connect the piano key switches to appropriate music staff illuminating means in accordance with desired key signature. It will be recalled that throughout these manipulations, the appropriate keyboard illuminating means remained constant for any given key. However, as a corollary to the concept in which a plurality of different musical sounds can be represented by a common note symbol, depending upon the musical key signature, it follows that once a musical key signature has been selected, only one of the plurality of keys is appropriate, and the other two are not. Accordingly, music teaching apparatus according to the invention is provided with an error circuit means operatively associated with the selector switch means for indicating depression of a key not desired in a selected key signature. Such means include a visible alarm and means for energizing the visible alarm in response to depression of a key not desired in a selected musical key signature.

In the illustrated embodiment, each first switch means is a two-position switch means, including two exit poles for each entry pole. Again considering switch 116, exit pole 244 is operatively connected to the keyboard and staff lamps, as discussed previously. However, a second exit pole 265 is also provided. Whenever the sound known as natural C is not desired in a given musical key signature, first switch means 186 is postitioned so that the entry pole of each switch such as 116 is bridged to the exit pole which is not associated with the illuminating means. In such position, the entry pole of switch 116 is bridged to exit pole 265. Whenever the $C^3$ natural key is then depressed, a signal passes from exit pole 265 to conductor 266 and through conductor 268 to energize visible alarm 270. As is best seen in FIG. 1, visible alarm 270 takes the form of a colored lamp prominently mounted on the display panel. Thus by provision of means for selecting the position of first switch means 186, means are provided for selecting the first switch means through which the visible alarm is connected in a desired musical key signature. The conductive path between the visible alarm and the control switch means 28 constitutes means electrically connecting the visible alarm through the first switch means to the control switch means. It will be appreciated that every first switch means is similarly electrically connected to the visible alarm 270. For example, consider first switch means 190, which is illustrated in FIGURE 6 as bridging the entry poles and the error circuit poles. In this position, depression of any C♯–D♭ key on the keyboard of the piano causes a signal to pass to conductor 272 and then through conductor 266 to energize the visible alarm 270. First switch means 192 is provided with a set of error exit poles which can pass a signal through conductor 274 to energize visible alarm 270 when the switch means is positioned to bridge the entry and error exit poles. First switch means 188, which is illustrated as bridging the entry poles and error exit poles, passes a signal to conductor 276 which energizes visible alarm 270 upon depression of any D natural key.

For more dramatic impact in warning a student when a mistake has been made, an audible alarm is provided in the error circuit and operatively connected for simultaneous energization with the visible alarm. In the embodiment illustrated, the audible alarm 278 is shown in parallel circuit relationship with visible alarm 270. The audible alarm may be a buzzer, horn, or the like. However, since the audible alarm is not always desirable, a switch 280 is provided for selectively preventing energization of audible alarm 278. By opening switch 280, the audible alarm 278 is not energized even though visible alarm 270 is activated upon depression of any undesired key. The location of switch 280 to be within easy reach of the operator can be seen in FIGURE 1.

Music teaching apparatus according to the invention has great flexibility and is very useful as an aid in teaching many of the concepts involved in musical instruction. By placing the cancelling means in the inoperative position, the instructor can display entire musical scales in sequence on the musical staff arrangement. At the same time, the instructor can illustrate the relationship of this scale to the keyboard of the piano. By manipulation of the selector switch means, the instructor can show the effect of changes of key signature on the scales on the staff arrangement, and show how a plurality of different keys on the piano keyboard can correspond to the same music note position on the staff. For example, when the key signature calls for all C's to be played as C♯, the first switch means 186 is switched so that depression of the natural key will send an impulse into the error circuit. At the same time, first switch means 190 is switched so the depression of the C♯ keys will energize the keyboard C♯ lamps and pass a signal to a second switch means 218 which is positioned so that the leads from first switch means 190 are connected through the sharp entry poles of second switch means 218 to the staff C lamps. It can be seen that the staff lamps and the depicted keyboard lamps can be simultaneously illuminated, or simultaneously prevented from energization when not desired in a scale.

Other features of the invention are highly advantageous. The error circuit system provided instantly warns when a mistake has been made so that the mistake can be immediately identified and corrected. The changeable key signature provisions facilitates instruction in the use and effect of musical key signatures. Thus, music teaching apparatus according to the invention includes a large number of desirable features which are useful in musical education. This multiplicity of features has been provided in a device which is relatively simple to construct and to operate and is rugged and durable in use. Moreover, the apparatus is sufficiently compact as to be readily portable, or be built into an instrument if desired without interferring with the internal mechanism of the instrument.

Although the present invention has been described and illustrated in connection with a preferred embodiment, it is understood that resort can be had to modifications and variations of the embodiment illustrated without departing from the spirit of the invention, as those skilled in the art will readily understand. Such modifications and variations are considered to be within the scope of the present invention.

What is claimed is:

1. Music teaching apparatus, comprising
   display panel means including means depicting a series of distinctive musical tone positions, and means for illuminating each tone position,
   control switch means adapted to be operatively associated with keys on the keyboard of a musical instrument, for selectively energizing the illuminating means in response to depression of the keys, the control switch means including
   means for maintaining the respective illuminating means in energized condition upon release of a depressed key when the control switch means is in a first position,
   means for deenergizing the respective illuminating means upon release of a depressed key when the control switch means is in a second position, and
   means for selecting the position of the control switch means, and
   electrical circuit means for electrically connecting in circuit relationship the illuminating means, the control switch means, and a source of electrical energy.

2. Music teaching apparatus as defined in claim 1, and further comprising,
   selector switch means in circuit relationship with the control switch means and the illuminating means, for selecting the illuminating means to be energized upon depression of a selected key which is the illuminating means corresponding to the musical tone position of the selected key in a desired musical key signature.

3. Music teaching apparatus as defined in claim 2, and further comprising,
   error circuit means operatively associated with the selector switch means, for indicating depression of a key not desired in a selected musical key signature, and including
   a visible alarm, and
   means for energizing the visible alarm in response to depression of a key not desired in a selected musical key signature.

4. Music teaching apparatus as defined in claim 3, and further comprising,
   an audible alarm in parallel circuit relationship with the visible alarm in the error circuit means and operatively connected for simultaneous energization with the visible alarm, and
   means for selectively preventing energization of the audible alarm.

5. Music teaching apparatus as defined in claim 1, wherein the means depicting a series of distinctive musical tone positions includes means depicting a musical staff arrangement, and further comprising, means associated with the staff arrangement for depicting musical key signature, and including a plurality of triangular members each having musical sharp symbolism depicted on one face, musical flat symbolism depicted on another face, and blank staff symbolism depicted on a third face, and means mounting each triangular member for rotatable movement on the display panel to a position in which any selected face is in generally coplanar relationship with the musical staff arrangement.

6. Music teaching apparatus as defined in claim 5, wherein the means mounting each triangular member includes vertically extending shaft means journaled in the display panel means.

7. Music teaching apparatus as defined in claim 1, wherein the control switch means includes an elongated base member, a plurality of pushrod members carried by the base member and spaced longitudinally along the base member, each pushrod member adapted to be operatively associated with a key on the keyboard of the musical instrument, means mounting each pushrod member for vertical movement in response to depression and release of the key, each pushrod member having a horizontally swingable arm including a contact constituting a movable contact, a projecting member located adjacent each pushrod member and including a first fixed contact disposed to engage the movable contact upon horizontally swinging movement of the arm to close a circuit energizing illuminating means corresponding to the key, a protective member adjacent each pushrod member and disposed between the first fixed contact and the movable contact, means mounting each protective member for movement by the pushrod member, means for maintaining a portion of each first fixed contact exposed in a direction toward the movable contact past one end portion of the protective member, means located adjacent each pushrod member and biasing the arm of the pushrod member for swinging movement, cancelling means including a finger adjacent each pushrod member, the cancelling means being movable between an operative position in which the finger engages the pushrod member and maintains the movable contact spaced away from the first fixed contact against the force of the biasing means, and an inoperative position, the biasing means urging the movable contact into engagement with the first fixed contact past the one end portion of the protective member upon vertical movement of the pushrod member in response to depression of the key when the cancelling means is in the inoperative position, the pushrod member operative to move the protective member upon release of the key to maintain the movable contact in engagement with the first fixed contact to maintain the corresponding illuminating means in energized condition until the cancelling means is moved to the operative position, the protective member operative to return to disposition between the first fixed contact and the movable contact upon movement of the cancelling means to the operative position, and a second fixed contact located adjacent each pushrod member and disposed to engage the movable contact upon vertical movement of the pushrod member in response to depression of the key to close a circuit energizing the corresponding illuminating means when the cancelling means is in the operative position, and disposed to disengage the movable contact upon vertical movement of the pushrod member in response to release of the key to open said last named circuit.

8. Music teaching apparatus as defined in claim 7, wherein the biasing means comprises spring means including a contact engaging the movable contact, and wherein the movable contact constitutes a bridging contact.

9. Music teaching apparatus as defined in claim 1, wherein the means depicting a series of distinctive musical tone positions includes means depicting a music staff arrangement and means depicting at least a segment of the keyboard of the musical instrument, and the means for illuminating each tone position includes means for illuminating each music note position on the music staff arrangement and means for illuminating each key on the depicted keyboard, and further comprising, selector switch means in circuit relationship with the control switch means and the illuminating means, for selecting the iluminating means to be energized upon depression of a selected key which are the illuminating means corresponding to the musical tone position of the selected key on the music staff arrangement in a desired musical key signature and the illuminating means corresponding to the musical tone position of the selected key on the depicted keyboard, the selector switch means including first and second switchbank means, the first switchbank means having a first switch means corresponding to each key on the keyboard of the musical instrument throughout at least a chromatic octave, the second switchbank means having a second switch means corresponding to each music note position on a music staff throughout at least a diatonic octave, and wherein the electrical circuit means includes means electrically connecting each first switch means with the control switch means, means electrically connecting each first switch means with corresponding depicted keyboard illuminating means, means defining a plurality of separate, selective circuits for electrically connecting each first switch means with every second switch means which is the second switch means corresponding to a mustic staff note position of the key of the keyboard which is the key corresponding to the first switch means in the various musical key signatures, means electrically connecting each second switch means with corresponding mustic saff arrangement illuminating means, and means for selecting the circuit electrically connecting each first switch means through the corresponding second switch means in accordance with a desired musical key signature.

10. Music teaching apparatus as defined in claim 9, and further comprising, error circuit means for indicating depression of a key not desired in a selected musical key signature, and including a visible alarm, means electrically connecting the visible alarm through each first switch means to the control switch means, and means for selecting the first switch means through which the visible alarm is connected in a desired musical key signature.

11. Music teaching apparatus as defined in claim 10, and further comprising, an audible alarm in parallel circuit relationship with the visible alarm in the error circuit means and operatively connected for simultaneous energization with the visible alarm, and means for selectively preventing energization of the audible alarm.

12. Music teaching apparatus as defined in claim 7, wherein the means depicting a series of distinctive musical tone positions includes means depicting a musical staff arrangement, and further comprising changeable means associated with the staff arrangement for depicting musical key signature, and including a plurality of triangular members each having musical sharp symbolism depicted on one face, musical flat symbolism depicted on another face, and blank staff symbolism depicted on a third face, and means mounting each triangular member for rotatable movement on the display panel to a position in which any selected face is in generally coplanar relationship with the musical staff arrangement.

13. Music teaching apparatus as defined in claim 12, wherein the means mounting each triangular member includes vertically extending shaft means journaled in the display panel means.

14. Music teaching apparatus as defined in claim 7, and further comprising means for locking the cancelling means selectively in the operative position.

15. Music teaching apparatus as defined in claim 1, wherein the means depicting a series of distinctive musical tone positions includes means depicting a music staff arrangement and means depicting at least a segment of the keyboard of the musical instrument, and the means for illuminating each tone position includes means for illuminating each music note position on the music staff arrangement and means for illuminating each key on the depicted keyboard, and further comprising selector switch means in circuit relationship with the control switch means and the illuminating means, for selecting the illuminating means to be energized upon depression of a selected key which are the illuminating means corresponding to the musical tone position of the selected key on the music staff arrangement in a desired musical key signature and the illuminating means corresponding to the musical tone position of the selected key on the depicted keyboard, the selector switch means including first and second switchbank means, the first switchbank means having a first switch means corresponding to each key on the keyboard of the musical instrument throughout a chromatic octave, each first switch means having a separate entry pole and exit pole corresponding to each key on the keyboard of the musical instrument which is operatively associated with the control switch means and which is assigned the same relative position in a chromatic scale, the second switchbank means having a three-position, second switch means corresponding to each music note position on a music staff throughout a diatonic octave, each second switch means having a separate sharp entry pole, a flat entry pole, a natural entry pole, and an exit pole corresponding to each music note position on the staff arrangement which is assigned the same relative position in a diatonic scale, and wherein the electrical circuit means includes means electrically connecting each entry pole of each first switch means with the control switch means, means electrically connecting each exit pole of each first switch means with a corresponding depicted keyboard illuminating means, means selectively, electrically connecting the exit poles of the first switch means to the sharp entry poles, the flat entry poles, and the natural entry poles respectively of the corresponding second switch means which are the second switch means corresponding to the music staff note positions which are the music staff note positions of the keys on the keyboard which are the keys corresponding to the exit poles of the repective first switch means in the various musical key signatures, means electrically connecting each exit pole of each second switch means with corresponding music staff arrangement illuminating means, and means for selecting the position of each second switch means to selectively electrically connect the first switch means through the corresponding second switch means in accordance with a desired musical key signature.

16. Music teaching apparatus as defined in claim 15 wherein each first switch means is a two-position switch means and includes a second exit pole for each entry pole, and further comprising error circuit means for indicating depression of a key not desired in a selected musical key signature and including a visible alarm, means electrically connecting each second exit pole of each first switch means to the visible alarm, and means for selecting the position of each first switch means to selectively electrically connect the appropriate first switch means to the visible alarm in accordance with a desired musical key signature.

17. Music teaching apparatus as defined in claim 16 and further comprising, an audible alarm in parallel circuit relationship with the visible alarm in the error circuit means and operatively connected for simultaneous energization with the visible alarm, and means for selectively preventing energization of the audible alarm.

References Cited

UNITED STATES PATENTS

| | | | |
|---|---|---|---|
| 2,225,084 | 12/1940 | Pierce | 84—477 |
| 2,547,535 | 4/1951 | Pierce | 84—473 |
| 2,613,569 | 10/1952 | Williams | 84—471 |
| 2,814,230 | 11/1957 | Johnston | 84—478 |

ROBERT S. WARD, Jr., Primary Examiner

JOHN F. GONZALES, Assistant Examiner